Figure 3:
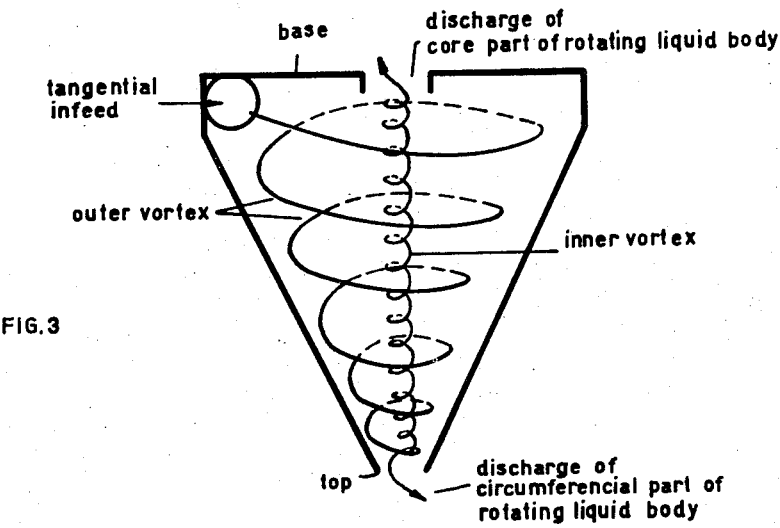

Jan. 25, 1955  F. J. FONTEIN  2,700,468
CENTRIFUGAL METHOD AND APPARATUS FOR SEPARATING SOLIDS
Filed April 12, 1949.  7 Sheets-Sheet 1
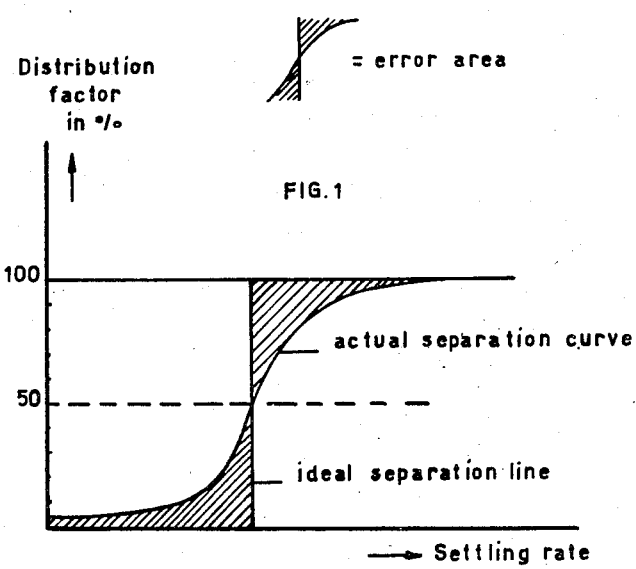
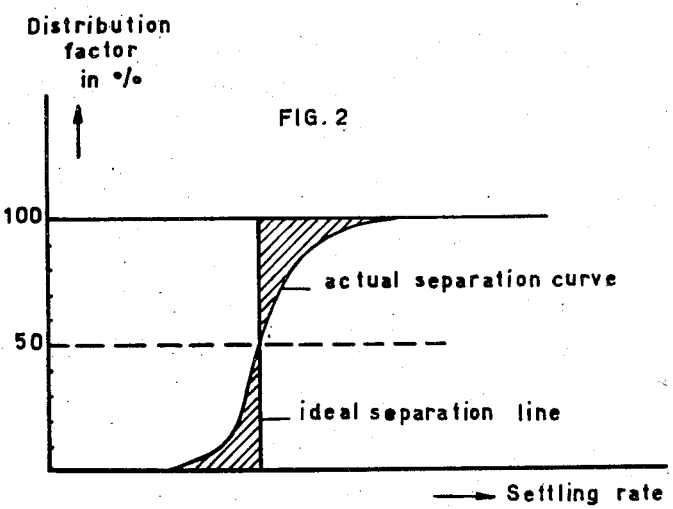
INVENTOR:
FREERK JAN FONTEIN,
BY
Arthur Nidsleton
ATTORNEY Jan. 25, 1955  F. J. FONTEIN  2,700,468
CENTRIFUGAL METHOD AND APPARATUS FOR SEPARATING SOLIDS
Filed April 12, 1949  7 Sheets-Sheet 3
FIG. 6
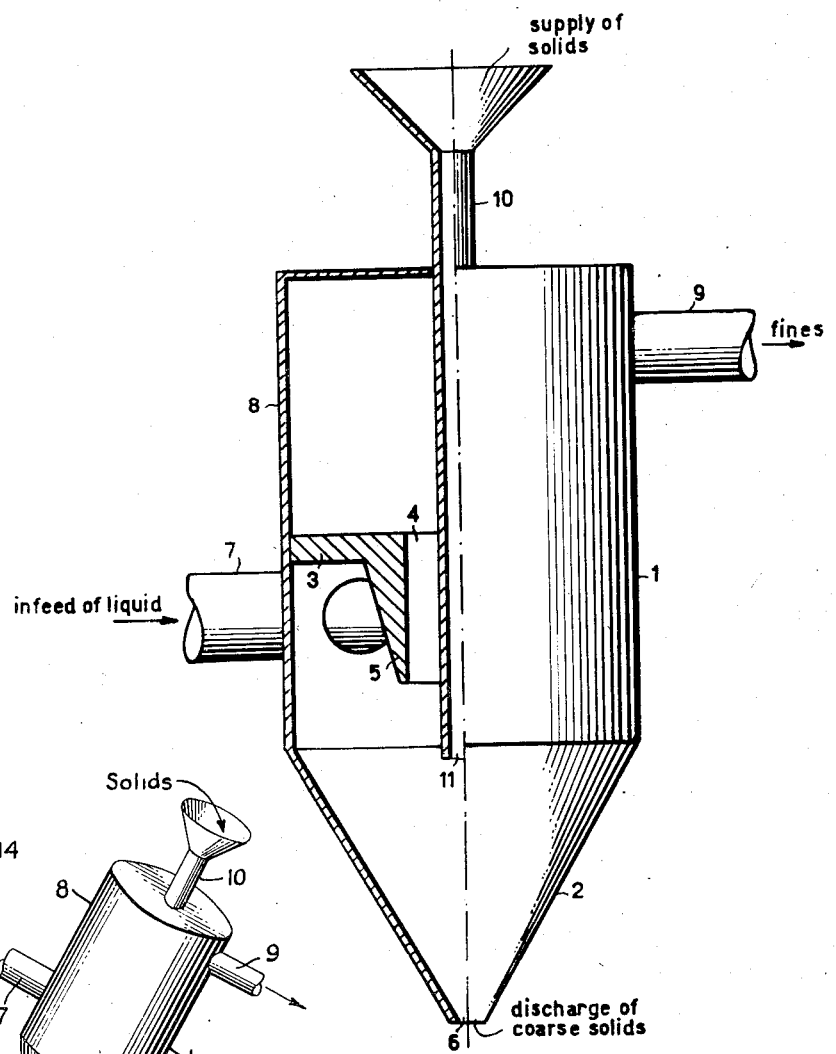
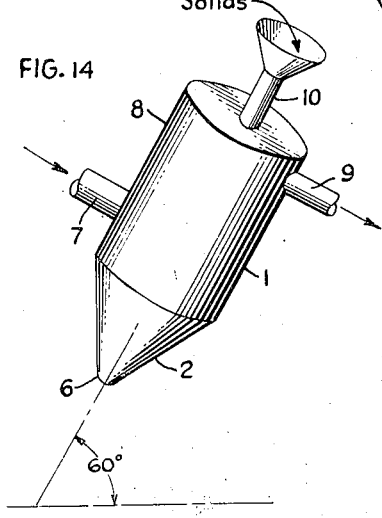
FIG. 14
INVENTOR:
FREERK JAN FONTEIN,
BY
ATTORNEY

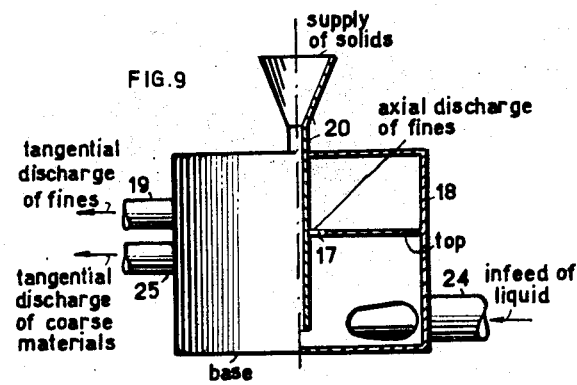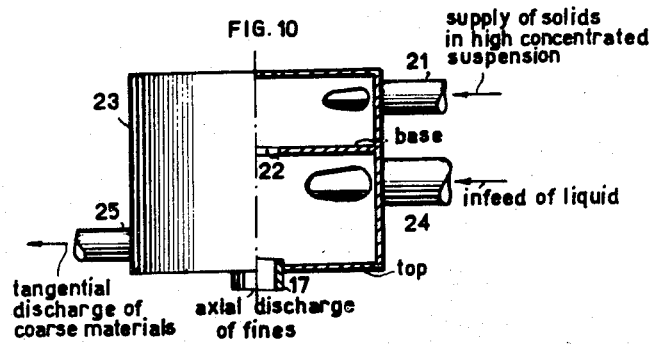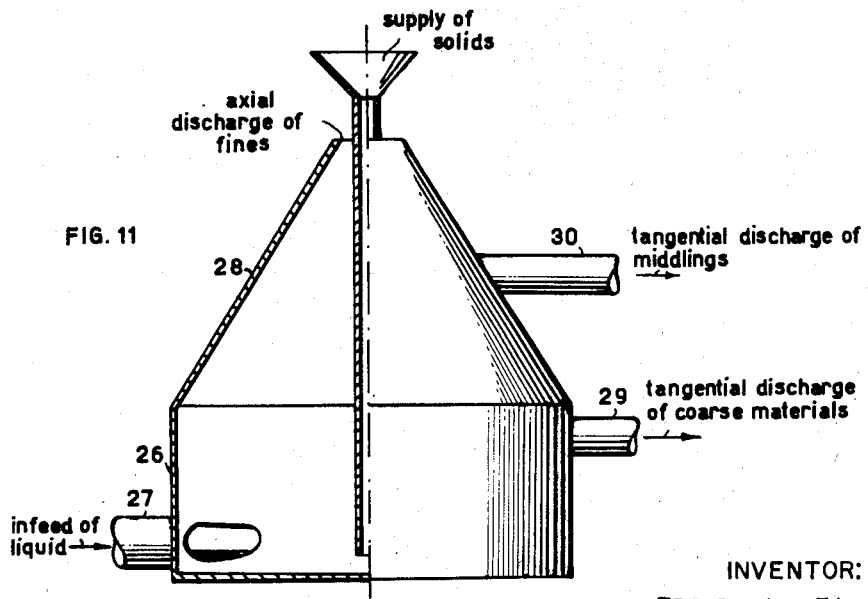

Jan. 25, 1955    F. J. FONTEIN    2,700,468
CENTRIFUGAL METHOD AND APPARATUS FOR SEPARATING SOLIDS
Filed April 12, 1949    7 Sheets-Sheet 6

INVENTOR:
FREERK JAN FONTEIN,
BY Arthur Middleton
ATTORNEY

United States Patent Office 2,700,468
Patented Jan. 25, 1955

2,700,468

CENTRIFUGAL METHOD AND APPARATUS FOR SEPARATING SOLIDS

Freerk Jan Fontein, Heerlen, Netherlands, assignor to Stamicarbon N. V., Heerlen, Netherlands Application April 12, 1949, Serial No. 87,076

Claims priority, application Netherlands April 14, 1948

20 Claims. (Cl. 209—211)

The invention relates to a centrifugal method and means for fractionating solids in liquid suspension thereof according to the settling rate of said solids. More specifically the invention relates to that process and the means for performing that process, according to which a separation between solid particles of different settling rates is obtained in a liquid body compelled to rotate rapidly in a confined circular space by feeding a stream of liquid tangentially into said space and continuously discharging part of the liquid at one end and centrally therefrom.

Vortical flow will be created in the liquid body in this way, the rotational speed of which increasing towards the central zones of the body as part of the liquid is compelled to rotate along decreasing circles and finally to discharge centrally. Excessive rotational speed can be obtained easily in the central layers corresponding to a centrifugal acceleration up to 10,000 times that of gravity or even more for devices of small cross-sectional diameter. The circumferential speed of the liquid body, corresponding to the infeed speed will be much lower than the rotational speed at the center. This infeed speed depends on the dimensions of the device used and the pressure applied to the infeed, but, generally speaking, this speed can be said as to be of the order of magnitude of 10 feet per second for devices of 15–20 inches maximum cross-sectional diameter, increasing to the order of magnitude of 30 feet per second for devices not over 2 inches maximum diameter, for normal operations although speeds as high as 100 feet per second may be obtained when applying high feed pressures.

Three distinct directions of flow can be distinguished in the rotating liquid body, viz:

(i) An axial movement, due to which the liquid streams towards the end of the confined circular space, (ii) A rotational movement, increasing towards the center, and (iii) A radial inward movement, resulting in the transport of liquid towards the center.

A solid particle introduced into the rotating liquid body will react to the forces corresponding to those three distinct directions of flow in such a way that:

(i) It will be transported towards the end of the confined circular space, (ii) It will be thrown to the circumference, and (iii) It will be dragged into the central part of the liquid body.

Obviously, the latter two movements being opposite, the solid particle will respond to the difference of the corresponding forces being the centrifugal force and the concomitant radially directed centripetal force flow. The reaction of the solid particle to each of these forces depends on the particle itself, greater and heavier particles being more responsive to the centrifugal force and smaller and lighter particles on the contrary being more responsive to the frictional force of flow.

So the former particles will be preferably thrown towards the wall, whereas the latter will move towards the center.

This phenomenon can and has hitherto been used for fractionating solids, feeding a liquid suspension of such solids tangentially into a confined circular space, centrally and continuously discharging part of the liquid together with the finer and lighter solids near the center and at one end of the space, and circumferencially and continuously discharging part of the liquid containing the coarser and heavier solids.

Obviously it will be very difficult to state the exact responsiveness of solids of different kinds in the rather complicated circumstances inside the rotating liquid body. But it may be said that for practical purposes the settling rate of particles in still water gives in itself a fair indication of the said responsiveness. Now the finer and lighter solids related to hereabove will have a small settling rate as compared with the coarser and heavier solids.

When a mixture of solids of different grain size but of equal specific gravity is to be fractionated and no particles present in the mixture have a rather flat or elongated form, the separation is ruled by the grain sizes of the particles only and consideration of the settling rates can be dispensed with. In most cases however particles differ also in specific gravity and particles differing considerably from the ideal round shape and smooth surface condition are not of uncommon excellence, and in all these cases the settling rate of the particles is a convenient comparison for the reaction of the particles in the centrifugal separation method set forth.

In the various ways this process as described so far has been used and proposed for fractionating solids of different settling rates, the solids always being introduced into the rotating liquid body at the circumference thereof and mostly mixed with the liquid to be tangentially introduced into the confined circular space.

It is now an object of my invention to improve this method of separation in such a way as to increase the sharpness of separation.

It is also an object of my invention to provide for new apparatus in which said centrifugal fractionating method may be performed with better results than hitherto has been possible.

Other objects will become apparent in the following description of the method and means according to the invention.

In brief the invention calls for tangentially introducing liquid into a confined circular space to create a rapidly rotating liquid body therein, feeding a mixture of solids axially into said space continuously discharging part of the liquid and solids of relatively low settling rates centrally at one end whereby to create an inward flow of liquid and continuously discharging other parts of the liquid and solids of relatively high settling rates elsewhere.

This method is distinguished from the other methods referred to hereabove in that the displacement in radial direction of the solid particles is reversed. Hitherto, the particles of relatively low settling rates were dragged to the core, whereas the particles of relatively high settling rates remained at the circumference, being not able to yield to the inward force of flow as they were retained by the centrifugal force. According to the invention the solids are introduced axially into the liquid body, that is to say in the central zones. The particles of relatively low settling rate will now remain in that core and the particles of relatively high settling rates will be thrown towards the circumference. This difference results in a considerable increase in sharpness of separation.

In a mixture of solids containing particles of a wide range of settling rates there will always be present an amount of particles which are substantially equally responsive to the centrifugal force and the frictional force of flow. Such particles will accidentally be discharged from the core or from the circumference. As obviously theoretical ideal separation circumstances can never be obtained in practice, also particles differing only slightly in settling rate from those equally responsive particles cannot be discharged for a full hundred per cent from the right side. So from every fractionating device fractions will be obtained which contain particles, which under ideal circumstances would not be present in those fractions. The total amount of such particles of each distinct settling rate present in a fraction stands for the total error of the separation. This has been illustrated in Fig. 1, in which the separation curve of an arbitrary separation has been represented. The difference from the ideal separation line shows the error made in the actual separation, the hatched surface being a measure in an inverse way for the sharpness of separation, the latter being infinite for the surface being reduced to zero.

I have now found that when introducing the solids at or near the axis of the rotating liquid body, said error surface will be reduced considerably, or in other words the slope of the actual separation curve will become steeper as compared with methods hitherto used or proposed, and especially at that part of the curve representing the distribution of the smaller settling rate particles so the solids will be separated to a greater extent. In Fig. 2 the improved results are graphically shown.

Although such explanation may not exactly represent the actual occurrences in the rotating liquid body, the improved results of the method according to my invention may be caused by the fact that the frictional force of flow caused by the axial flow of the liquid is of some influence as to the movement of the solid particles and particularly with respect to the particles of very low settling rates, the latter being the most responsive to frictional force of flow. This liquid-flow force is impelling on the particles causing them to travel or to be dragged towards the several discharges. This dragging or frictional force exerted on the solid particles by the liquid flow resolves itself into components of which only two are important here, namely, a radial (centripetal) force impelling particles in a radial direction, and an axial force impelling particles in an axial direction. Although the first considerably exceeds the latter, obviously, this latter also will influence the direction of movement of the particles. At the circumference, the radial flow is small as compared with the same force in the core parts of the liquid body and as a result the impact on the solid particles caused by the axial force of flow will be higher at the circumference relatively to the impact due to the radial force of flow, as compared with the same impact at the center.

A solid particle of relatively small settling rate introduced tangentially into the rotating liquid body or, in other words, circumferentially positioned, although subject to an inward movement will also be dragged along to the circumferential discharge by the relatively important axial frictional force of flow.

Particularly the smallest particles present, in ore separation techniques often referred to as "slimes" will accordingly be discharged, so these particles up to a certain amount will be found present in the separated fraction of the particles of relatively high settling rates, which phenomenon is a very inconvenient fact in centrifugal fractionating methods as hitherto performed. This phenomenon is graphically illustrated in Fig. 1, which shows a very typical "tail" for small values of the settling rate. It is therefore an object of my invention to reduce this "tail." Centrally introducing of the mixture of solids positions said particles in the core zone, in which the said axial force of flow has only the effect of dragging these particles towards the central discharge, exactly to the point where they failed to go in feeding the particles tangentially.

It may be considered a very convenient coincidence that in the core part of the liquid body the axial force of flow is small as compared with the other forces. Otherwise a great deal of particles of relatively higher settling rates would also discharge centrally and no essential improvement would be obtained. In fact no such phenomenon occurs, the effect of the axial force of flow is only demonstrated in the result that the fractionating now takes place at a slightly higher separation curve.

Figure 4:
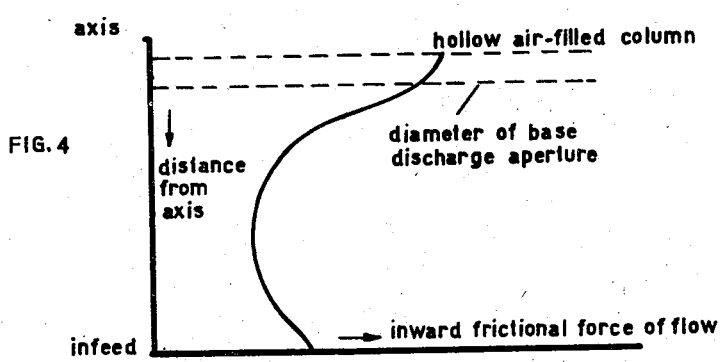
Figure 5:
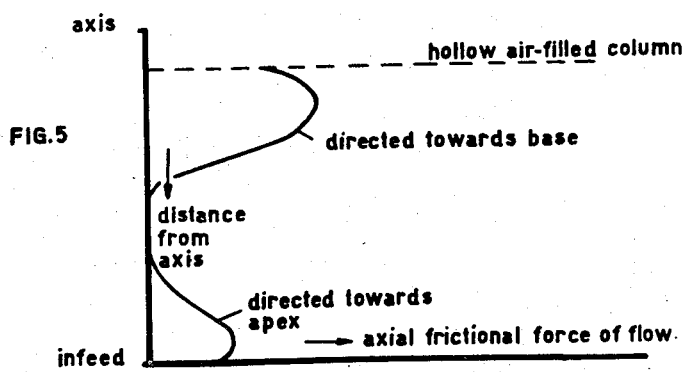

For a better understanding of the rather complicated circumstances in a rotating liquid body the axial and tangenial flow lines have been illustrated in Fig. 3, representing a separation device of the "return-flow type," commonly referred to as "cyclone," in which two vortices of the same rotational sense, but of opposite axial direction are obtained. It may be stated here, that the side near the tangential inlet may be referred to as "base," whereas the other side, in this case the apex end, may be called "top." The forces active in the rotating liquid body in this cyclone have been plotted in an arbitrary measure in Figs. 4 and 5, which may be illustrative with respect to the explanation discussed hereabove.

Fig. 3 also gives a diagrammatical view of one special type of device in which the improved method according to the invention may be carried out, which type is commonly referred to as "cyclone." An apparatus of this type especially adapted to perform the method of the invention is illustrated in Fig. 6. For simplicity's sake the performance of the different apparatus will be described hereinafter with respect to the fractionating of a mixture of solids of equal specific gravity.

The cyclone of Fig. 6 consists of a cylindrical part 1, to which a conical part 2 and a cover plate 3 with central aperture 4 are attached. A short pipe or vortex finder 5 serves as a separation between the outer and inner vortex near this aperture. The conical part is provided with an axial aperture 6 for the coarser fraction. A tangential feed pipe 7 enables the liquid to be supplied under pressure. Aperture 4 gives access to hood 8, which is provided with a tangential outlet 9 for the finer fraction. By means of funnel 10 the product to be separated can be fed into the centre of the cyclone at 11. The flow of the liquid in the cyclone may appear from Fig. 3. The rotational speed in the centre becomes so excessive that an airfilled core extending from the base outlet to the top outlet, is formed. It may be stated here that, due to the very high speeds and correspondingly great forces impelling on the solid particles, gravity has no effect upon the separation. Therefore the device may be operated in every desired position.

Owing to the presence of the liquid-free space in the heart of the cyclone the mixture must be prevented from falling out of the cyclone through the opposite aperture, by putting the cyclone in such a position that its axis is inclined to the vertical, as for instance by installing it horizontally.

However if a cylindrical cyclone is used these precautions need not be taken. The top aperture of these cyclones is not axially situated but located in the periphery. Thus it need not be feared that the axially supplied mixture will fall out of the apparatus. Although the cyclone is put in a vertical position the mixture may be supplied through a feed pipe extending through the base aperture to or beyond the heart of the cyclone.

In this case it may be more advantageous to use the feed pipe as a downcomer.

If the cyclone is put in such a position that its axis is inclined to the vertical as has been described for the conical cyclone it will usually be necessary to use a special transport device for instance a screw conveyor.

A conical cyclone might be installed in a vertical position if a divider is fitted in the heart of the cyclone by which the down falling mixture would for instance be dispersed in a horizontal direction. In this way however one of the major advantages of the cyclone viz. its simple construction and the absence of moving parts would get lost.

Figure 7:
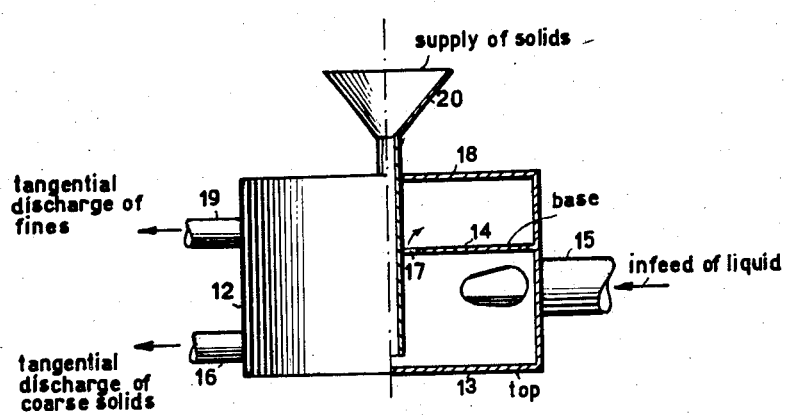

A cylindrical cyclone is represented in Fig. 7, consisting of a cylindrical vessel 12, the cover plate 13 of which has to be considered as the top side, wall 14 constituting the base, because the tangential inlet 15 has been fitted near this side.

Through this inlet water is fed into the cyclone under pressure after which it is partly discharged via the tangential outlet 16 fitted near the top side, which carries off part of the liquid from the outer vortex, partly through the axial aperture 17 located in the base, through which part of the liquid from the inner vortex is carried into hood 18, from where this fraction is discharged through the tangential tube 19.

By means of a funnel 20 the product to be classified is fed into the cyclone as far as the base (in this case the top side) in a dry or pulpy state, from where it is entrained by the liquid and separated into a finer and coarser fraction.

When comparing the two apparatuses described above the latter offers the advantage that it can be constructed in a simpler way and that for the supply of the dry product its axis need not be inclined to the vertical.

When treating a pulpy product the two devices may also be installed in a horizontal position while the pulp is supplied under pressure. It is also possible to feed a dry product in this way, if the funnel is provided with a screw conveyor.

In the base of the funnel the substance will naturally exert a retarding effect on the speed of rotation of the liquid.

Figure 8:
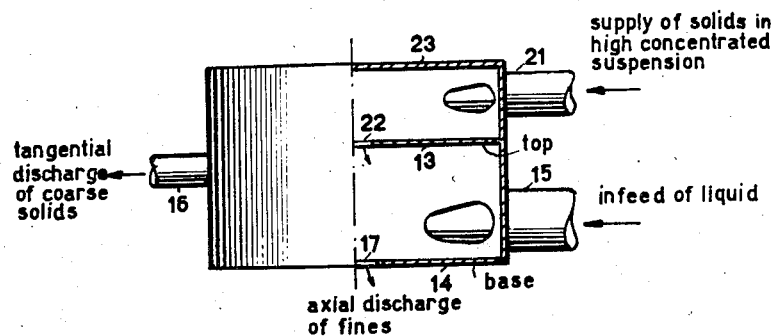

This can be avoided by a rotating feed of the mixture to be separated. When doing so the cyclone is preferably fitted with a spin chamber which is connected with the cyclonic space by means of the central top aperture of the latter, and the mixture to be separated is tangentially fed to the spin chamber as a concentrated suspension, so that this mixture adopts a rotating movement similar to the rotation of the liquid mass in the cyclone. The rotating concentrated suspension leaving the vortex chamber mixes with the similarly rotating liquid in the cyclone. In this way the vortices in the cyclone are less seriously disturbed and the pressure under which the mixture is supplied to the cyclone may be decreased. This can be performed in a device as represented in Fig. 8. This device differs from the former in that hood 23 is not fixed at the base 14, but on the opposite top side 13, giving access to the cyclonic space via an aperture 22. The hood is provided with a tangential feed pipe 21. Its operation is as follows.

Just like in the previous example water is supplied to the cyclone through pipe 15, partly leaving the cyclone through discharge tube 16, partly at 17. A very concentrated suspension of the mixture to be separated is pressed into the hood via the supply pipe 21, where it adopts a rotating motion, subsequently while this motion is continued, it enters axially the cyclone where it is caught by the inner vortex. The finer particles are retained by this vortex and are discharged via base aperture 17, the coarser ones are dispersed and leave the cyclone through the tangential outlet 16.

Naturally, instead of a cylindrical also a conical spin chamber may be employed for feeding the mixture. In this case hood 23 of Fig. 8 is replaced by a conical chamber, the apex of which is directed to the aperture 22.

The devices according to Figs. 7 and 8 may be operated in any position desired.

It will be clear that in order to obtain satisfactory separation the central infeed must be positioned at a point functionally remote from the discharge of the central parts of the rotating liquid body, as otherwise the solids would only profit from the separation action in a too restricted part of the liquid body. When using cyclones this infeed therefore must be positioned in the heart of the cyclone or in the special cases illustrated in Figs. 7 and 8 in the base and top parts.

The improved results obtained with a cyclone of the kind shown in Fig. 6 may be illustrated by the following experimental data in comparison with a similar cyclone with combined tangential infeed of liquid and solids to be separated.

A mixture of fine sand and the air-borne silt, known as loess had to be fractionated in a cyclone.

The size distribution of the mixture is shown in Table I.

Table I

| Through sieve No.— | Size up to— | Amount in percent of weight |
|---|---|---|
|  | Mu |  |
|  | 10 | ¹ 14.0 |
|  | 20 | ¹ 18.2 |
|  | 40 | ¹ 49.3 |
| 230 | 62 | 71.0 |
| 140 | 105 | 73.2 |
| 70 | 210 | 85.5 |
| 45 | 350 | 96.9 |
| 35 | 500 | 99.6 |

¹ Determined by sedimentational analysis.

The cyclone in which the fractionating was performed showed the following typical dimensions:

Maximal cross-sectional diameter_____inches__ 2.36
Diameter of tangential infeed pipe_____do____ 0.71
Diameter of base discharge aperture_____do____ 0.71
Diameter of apex discharge aperture_____do____ 0.27
Height of cylindrical part_____do____ 1.57
Distance between base and central delivery of solids _____inches__ 3.74
Angle of taper of conical part_____degrees__ 20

Water was tangentially introduced into the cyclone to an amount of 354 gallons per hour, 327 gallons per hour discharging through the base aperture and 27 gallons per hour discharging through the apex aperture. The mixture was delivered through a feed pipe protruding into the cyclone through the base aperture.

The results obtained are plotted in Table II together with the best results obtained when feeding the mixture together with the liquid tangentially into the cyclone.

Table II

| Particle size in mu | Distribution factor in percent central delivery | Distribution factor in percent tangential delivery |
|---|---|---|
| 5 | 0 | 7 |
| 10 | 0 | 9 |
| 15 | 0 | 12¹ |
| 20 | 3 | 17 |
| 25 | 10 | 23 |
| 30 | 22 | 30 |
| 35 | 37 | 40 |
| 40 | 52 | 52 |
| 45 | 68 | 68 |
| 50 | 80 | 82 |
| 55 | 89 | 91 |
| 60 | 94 | 96 |
| 65 | 97¹ | 98¹ |

It shows clearly that the results according to my invention are considerably improved as compared with the method as hitherto performed, the amount of finest particles or slimes, being considerably reduced in the coarser fraction. The theoretical line of separation appears to be present at a size of 39 mu.

Apart from the action of the cyclone, the invention may also be realized by means of a rotating liquid body in which the axial direction of the liquid rotating round the axis is equal to the direction of the liquid rotating along the periphery. This is attained if both parts of the liquid body are carried off from the confined circular space at the side opposite to the supply.

From this it follows that unlike in the case of the cyclone, the liquid in the core must not move in an axial direction towards the feed but should move just like the peripheral liquid in the opposite direction. For the rest the action of this type of apparatus is similar to that of the cyclone. All remarks given in the foregoing about the application of the invention with regard to the cyclone mutatis mutandis also hold for the latter apparatus.

In Figs. 9 and 10 corresponding apparatuses are represented, in which the separation is carried out in spin chambers. In these devices the cyclonic action characterised by two axial vortices moving in opposite directions is absent, the entire body of liquid rotating in a single vortex. This is obtained by interchanging the position of the feed pipes 15 and the discharge pipes 16 of Figures 7 and 8.

In Fig. 9 water is tangentially pressed into the chamber by feed pipe 24 where it adopts a rotating motion. With the help of a funnel 20 the substance to be classified is centre-fed in a dry or pulpy state, and entrained by the rotating liquid.

The coarse particles are discharged through pipe 25, the fines leave through the central outlet 17 and pass into chamber 18 from where they are carried off through the tangential pipe 19.

The coarse particles are driven against the inward radial flow by the action of the centrifugal force.

In Fig. 10 the substance to be separated is centre-fed in a rotating movement by supplying a concentrated suspension tangentially to chamber 23 through tube 21. Just like in the aforementioned example the rotating motion is created by pressing water into the classifying chamber via feed pipe 24.

Naturally the rotation in both chambers must be equally directed. The suspension in chamber 23 is too highly concentrated to obtain a classification. The speed of rotation in the rotation chamber may also be considerably smaller than in the classifying chamber. The suspension enters the classifying chamber through aperture 22. The coarser and finer particles are discharged through pipe 25 and opening 17 respectively.

This type of apparatus may be symmetrically duplicated because unlike in the case of cyclones the side at which the mixture is supplied is not provided with an axial discharge aperture. The common base may in this case be dispensed with and the feed will be a tangential one which is located in the circumference between the two axial extremities while the liquid supplied will be divided into two vortices axially moving in opposite directions through the two halves of the device.

By means of these devices a very simple separation into more than two components can be affected. By reducing the diameter of the confined circular space from one side to the other successively fractions of ever decreasing size may be drawn off from the decreasing circumference and finally the finest fraction may be discharged axially.

A spin chamber for separating into three fractions has been schematically represented in Fig. 11.

This consists of a cylindrical part 26, in which a tangential supply pipe 27 discharges a conical part 28, and tangential discharge tubes 29 and 30. The mixture is supplied in the same way as described above.

The motion of the liquid is essentially identical with the one occurring in the apparatus represented by Fig. 9, with the understanding that the space of rotation is gradually decreasing.

In this way advantage is taken of the characteristic of a similarly rotating body that towards the centre the speed of rotation and consequently the centrifugal force is gradually increasing.

By withdrawing parts of the liquid mass decreasing in diameter from points located at various distances from the axis, the liquid body may be considered to consist of a number of layers each having its individual discharge. The layer round the axis is discharged axially. The particles fed into the column disperse through the various layers according to their settling velocity and are separated accordingly.

It is also possible to decrease the diameter stepwise at the points where the liquid is drawn off tangentially.

The mixture may also be supplied as a rotating concentrated suspension, through a central opening in the base. For this purpose an additional rotating space is constructed on the other side of the base, to which the suspension is tangentially supplied under pressure. Naturally the tangential discharge tubes may be fitted at more than two places thus increasing the number of fractions obtained to 9 or more.

The apparatus according to Fig. 11 may be duplicated symmetrically while the base-plate is left out.

Also by means of cyclones a separation into more than two fractions can be obtained. For this purpose however two cyclone chambers are required. Through the discharge opening for the coarse heavy particles of the first cyclone these particles have to be axially supplied to the second cyclonic space in which these, moreover concentrated, fractions are once more divided into two fractions. For this purpose the first cyclone may at the top be provided with a tubular outlet which extends into the second cyclone either through the base or through the top aperture of the latter.

In this case the first cyclone is preferably conically constructed, because through the central apex a rotating fraction can be drawn off. If the second cyclone is a cylindrical one the fraction will be supplied via an axial feed in the top side which at the same time can be used as the top discharge of the former.

Apart from the way according to the invention the supply to the first cyclone can also be performed in the well-known manner by tangentially feeding the mixture together with the liquid as a suspension. In this case the first cyclone will have a smaller separating effect.

Figure 12:
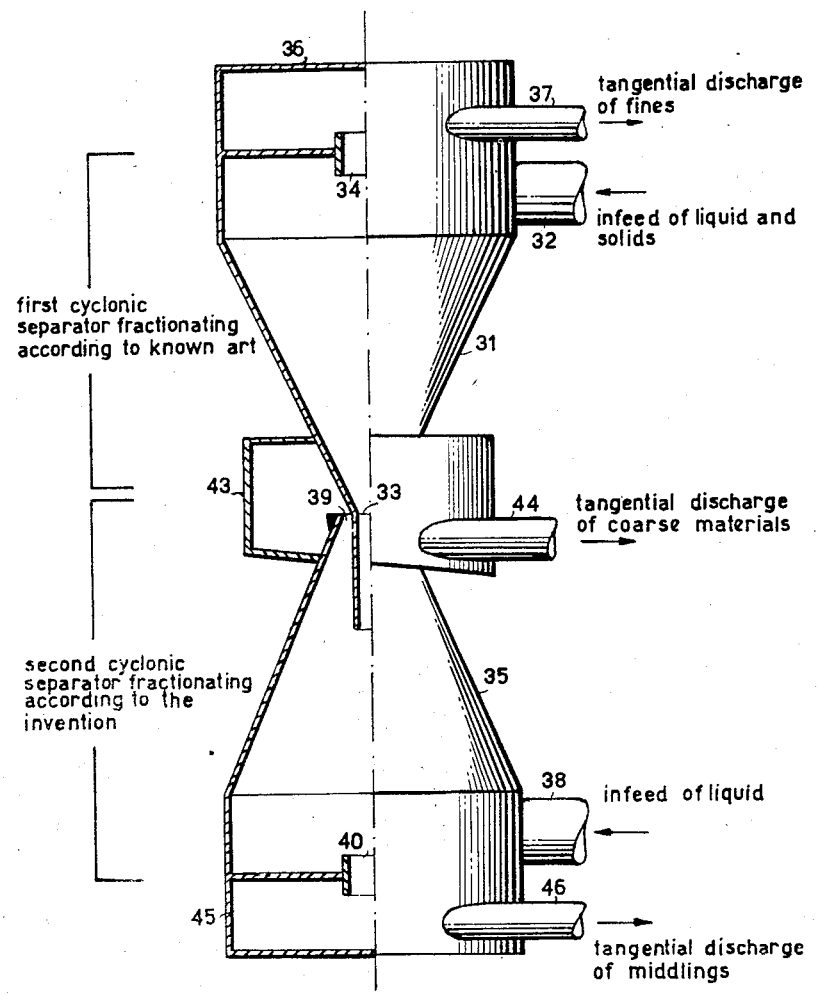
Figure 13:
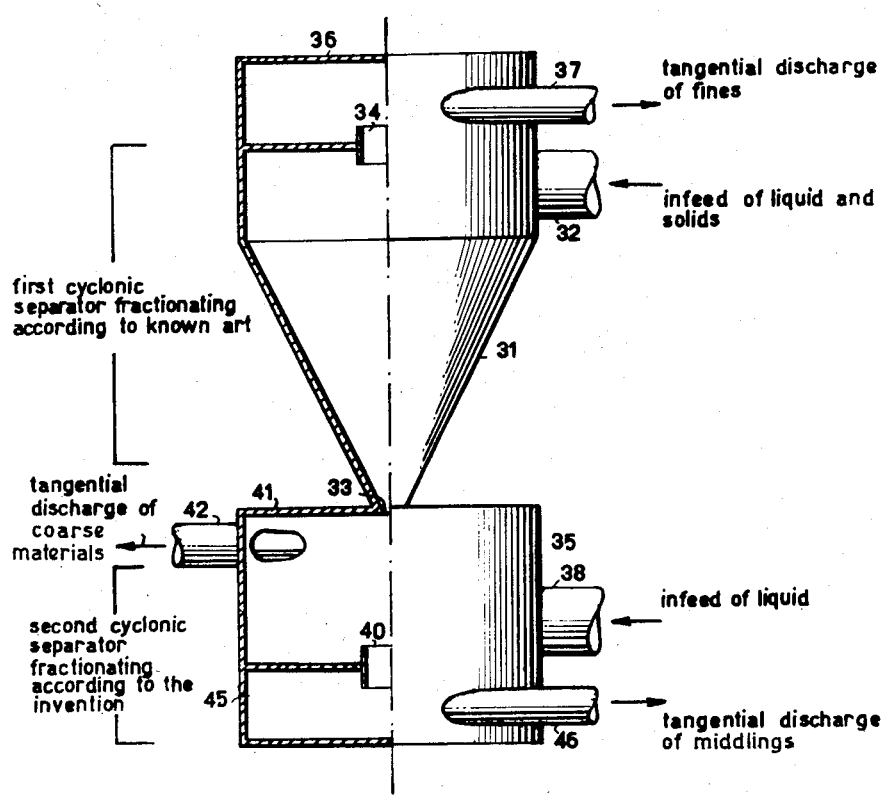

In Figs. 12 and 13 two devices are represented for the separation of mixtures into more than three fractions by means of the cyclonic action.

In Fig. 12 two cyclones, both being of the conventional conical construction, are combined in such a way that their apexes meet, the second cyclonic space of Fig. 13 being of a different construction. The operation is as follows. A suspension of the mixture to be separated is tangentially supplied under pressure to cyclonic space 31 via pipe 32.

In this space an outer vortex is created moving towards the apex aperture 33 and an inner vortex moving towards the base aperture 34.

The former vortex carries the coarser particles through apex aperture 33 into the cyclonic space 35, whereas the finer particles are transported into the hood 36 by the inner vortex via base aperture 34, leaving said hood tangentially via tube 37. Through tube 38 clean liquid is tangentially supplied to the cyclonic space 35.

Also in this space two vortices are created, an outer one moving towards the annular apex aperture 39 of Fig. 12, and an inner one moving towards the base aperture 40.

If the second cyclone is constructed cylindrically instead of conically in the way represented, by Fig. 13, the cover plate 41 must be considered as the top and the top aperture is formed by the opening giving access to tube 42, in which the liquid can enter tangentially. This offers the advantage that obstructing is less likely to occur.

The part of the suspension discharged through opening 33 gets into the lower part of the inner vortex by which it is entrained in the direction of the base aperture 40.

The coarser particles of this fraction, so the particles of an intermediate size, are forced towards the periphery and transported into drum 43 via aperture 39 (see Fig. 12) by the outer vortex after which they are tangentially discharged via tube 44.

The finest particles of the mixture leave the second cyclonic space via top aperture 40 and are tangentially withdrawn from hood 45 through tube 46.

In this way the mixture fed has been separated into fines, middlings and a coarse fraction.

The cyclones 31 can be constructed as represented by Fig. 6 thus in the first cyclones already taking advantage of the invention. In this case the device should naturally either be put in such a position that its axis is inclined to the vertical or be provided with a divider for the mixture to be separated.

Instead of cyclones also single rotary devices may be combined in the way described above, but this would serve no useful purpose as by means of these devices a simpler separation into more than two fractions can be obtained as has been stated before.

It is also possible to improve the sharpness of separation of a conical cyclone—whether or not provided with an outlet according to the invention. This improvement can be brought about by allowing the top aperture to discharge axially into a vortex space, in which the particles are subjected to the field of force in the way according to the invention, while at least the direction of the central rotation in the second space is identical to the central rotation in the conical cyclone.

Only for the coarsest fraction this second space is provided with a separate discharge aperture.

The finest respectively lightest particles are again forced towards the axis from where they are reversed into the cyclone via the common aperture.

Figure 14 is a view showing the cyclone of Fig. 6 in which the axis of the cyclone is inclined to the vertical.

In the foregoing the classifying medium has always been understood to be water. It is also possible to use other liquids by which, depending on their specific gravity, a separation according to another grain size is effected. This can also be obtained by adjusting the discharge apertures and/or the supply pressure in the way as has been suggested for the cyclone (Dutch Patent specification No. 48,934). If for instance the discharge opening 25 of the devices represented by the Figs. 9 and 10 is narrowed, more liquid will have to be discharged through the axial outlet 17. Consequently the gradient of the velocity of rotation increases towards the centre and also the centrifugal force. As a result of this the granular size according to which the mixture is separated will decrease. The same result is obtained by narrowing outlet 17. By increasing the supply pressure also the pressure of discharge at 25 and consequently the centifugal force in the whole chamber will be increased whereas the grain size of separation will be reduced.

The adjustment is preferably carried out by means of an adjustable elastical iris diaphragm in or behind the apertures (in the Figs. 9 and 10 in the tube 25, respectively behind the aperture 17, in the other figures behind the corresponding apertures). For this purpose either a hollow air operated rubber ring may be employed, or a perforated rubber disc, the inside diameter of which can be varied by applying fluid pressure and which have been described in detail in my copending application Serial Number 74,644, now Patent Number 2,649,963, filed February 4, 1949. The present application is a continuation-in-part of my application Serial No. 772,122, filed September 4, 1947.

It will be understood that various changes may be made in the construction and operation of the apparatus which have been described in detail hereabove without departing from the principles and scope of the invention.

I claim:

1. A cyclone comprising a conical vortex chamber having an outlet opening at its apex, a feed conduit for a liquid mass separation media opening tangentially to the larger end of the vortex chamber, a transverse wall at the larger end of the vortex chamber provided with a central outlet opening, an infeed tube for the material to be separated, said infeed tube extending axially into the vortex chamber through and centrally of said last mentioned outlet opening so that the inner and material delivering end of said tube faces the apex outlet of the vortex chamber, the outer surface of said tube being spaced radially inwardly from the edge of said last mentioned outlet opening to define an annular outlet for separated material concentric with said tube, the inner and material delivery end of said tube being positioned at a point spaced from and in axial alignment with the apex outlet opening of the vortex chamber, the vortex chamber being unobstructed at least between the inner and material delivery end of said infeed tube and the apex outlet opening.

2. A cyclone of the character described in claim 1 wherein the material delivering end of said infeed tube is positioned adjacent the larger end of the vortex chamber.

3. A cyclone of the character described in claim 1 wherein said infeed tube is movable axially of the vortex chamber.

4. A cyclone of the character described in claim 1 including means to support the cyclone vortex chamber with its axis inclined at an angle to the vertical.

5. A cyclone comprising a conical vortex chamber having an outlet opening at its apex, a feed conduit for a liquid mass separation media opening tangentially to the larger end of the vortex chamber, a transverse wall at the larger end of the vortex chamber provided with a central outlet opening, an outlet chamber beyond said wall and provided with an outlet opening and an end wall, an infeed tube for the material to be separated, said infeed tube being positioned centrally of said last-mentioned wall and extending axially into the vortex chamber through the central outlet opening of said transverse wall so that the inner and material delivering end of said tube faces the apex outlet of the vortex chamber, the outer surface of said tube being spaced radially inwardly from the edge of said last-mentioned outlet opening to define an annular outlet for separated material concentric with said tube, the inner and material delivery end of said tube being positioned at a point spaced from and in axial alignment with the apex outlet opening of the vortex chamber, the vortex chamber being unobstructed at least between the inner and material delivery end of said infeed tube and the apex outlet opening.

6. A cyclone of the character described in claim 5 wherein the material delivering end of said infeed tube is positioned adjacent the larger end of the vortex chamber.

7. A cyclone of the character described in claim 5 wherein said infeed tube is movable axially of the vortex chamber.

8. A cyclone of the character described in claim 5 including means to support the cyclone vortex chamber with its axis inclined at an angle to the vertical.

9. A cyclone comprising a conical vortex chamber having an outlet opening at its apex, a feed conduit for a liquid mass separation media opening tangentially to the larger end of the vortex chamber, a transverse wall at the larger end of the vortex chamber provided with a central outlet opening, an infeed tube for the material to be separated, said infeed tube extending axially into the vortex chamber through and centrally of said last-mentioned outlet opening so that the inner and material delivering end of said tube faces the apex outlet of the vortex chamber, the inner and material delivery end of said tube being positioned at a point spaced from and in axial alignment with the apex outlet opening of the vortex chamber, the vortex chamber being unobstructed at least between the inner and material delivery end of said infeed tube and the apex outlet opening, means to deliver a liquid mass separation media through said feed conduit under sufficient pressure to produce in said chamber inner and outer vortices rotating about a central air column which extends between the apex outlet and the outlet opening of said transverse wall, said infeed tube having an outside diameter smaller than the diameter of the air column, and means to support said chamber with its apex at such angle to the vertical that material moving from the inner and material delivering end of the tube will drop vertically through the air column and into the inner vortex formed in the vortex chamber.

10. The process of separating particles having specific gravities higher and lower than a predetermined specific gravity of separation which comprises tangentially feeding into a vortex space a liquid mass having a specific gravity approximating said specific gravity of separation and under such pressure as to form within said vortex space inner and outer vortices rotating in the same direction about an air column coaxial with the vortex space, but with the outer vortex moving toward the apex of the vortex space and the inner vortex moving toward the base of the vortex space, feeding the particles to be separated into the vortex space through the air column of the vortex space to a point spaced from the vortex apex and while maintaining the vortex axis at such angle to the vertical that the particles to be separated can fall vertically from the air column and into the inner vortex so that part of the liquid mass together with substantially all particles which have a specific gravity lower than said specific gravity of separation will be discharged from the base of the vortex space and the other part of the liquid mass together with the particles having a specific gravity higher than said specific gravity of separation will be discharged from the apex of the vortex space.

11. The continuous process of classifying a mixture of solids to segregate solids settling faster than a predetermined settling rate into one liquid-suspended coarse fraction and solids settling slower than that rate into a liquid-suspended fines fraction, which comprises maintaining a body of liquid in an enclosed circular casing having two discharge outlets of which at least one is axial, force-feeding liquid into the casing tangentially to one end of the liquid body with a pressure sufficient to set up in the body a vortically-spinning movement with inner and outer layers in which outer layers are segregated coarse solids while in the inner layers are segregated fine solids, discharging the fines fraction through the axial outlet and the coarse fraction through the other outlet, conducting the classifiable mixture axially into the casing in a direction opposite to that of the discharge of the fines fraction, and effecting radial counter-current classification by feeding the mixture substantially axially into the inner layers whereby the fine solids are retained from substantial departure therefrom.

12. The process according to claim 11, wherein the discharge of the fines fraction through the axial outlet is annular.

13. The process according to claim 11, wherein the coarse fraction in the outer layers moves to discharge through the other outlet in a direction that is opposite to that of the feed of the mixture of solids.

14. The process according to claim 11, wherein the coarse fraction in the outer layers moves to discharge through the other outlet in the same direction as that of the feed of the mixture of solids.

15. The process according to claim 11, wherein the casing is conical and the coarse fraction is discharged through the other outlet that is in the apex of the casing.

16. The continuous process of classifying a mixture of solids to segregate solids settling faster than a predetermined settling rate into one liquid-suspended coarse fraction and solids settling slower than that rate into a liquid-suspended fines fraction, which comprises maintaining a body of liquid in an enclosed circular casing having two discharge outlets of which at least one is axial, force-feeding liquid into the casing tangentially to one end of the liquid body with a pressure sufficient to set up in the body a vortically-spinning movement with inner and outer layers in which outer layers are segregated coarse solids while in the inner layers are segregated fine solids, discharging the fines fraction through the axial outlet and the coarse fraction through the other outlet, conducting the classifiable mixture axially into the casing in a direction the same as that of the discharge of the fines fraction, and feeding the mixture substantially axially into the inner layers whereby the fine solids are retained from substantial departure therefrom.

17. The process according to claim 16, wherein the coarse fraction in the outer layers moves to discharge through the other outlet in the opposite direction to that of the feed of the mixture of solids.

18. The continuous process of classifying a mixture of solids to segregate solids settling faster than a predetermined settling rate into one liquid-suspended coarse fraction and solids settling slower than that rate into a liquid-suspended fines fraction, which comprises maintaining a body of liquid in an enclosed circular casing having two discharge outlets of which at least one is axial, force-feeding liquid into the casing tangentially to one end of the liquid body with a pressure sufficient to set up in the body a vortically-spinning movement with inner and outer layers in which outer layers are segregated coarse solids while in the inner layers are segregated fine solids, discharging the fines fraction through the axial outlet and the coarse fraction through the other outlet, conducting the classifiable mixture axially into the casing through a funnel, and delivering such mixture from the funnel substantially axially into the inner layers where the fine solids are retained from substantial departure therefrom.

19. Apparatus for continuously classifying a mixture of solids to segregate solids settling faster than a predetermined rate of settling into a liquid-suspended coarse fraction and into a liquid-suspended fines fraction, which comprises an enclosed circular casing having one discharge outlet for the coarse fraction and an axial annular discharge outlet for the fines fraction, means for force-feeding liquid tangentially to the casing with pressure sufficient to set up in the casing a vortically rotating liquid body with inner and outer layers adapted centrifugally to segregate coarse solids in the outer layers and to segregate fine solids in the inner layers, and funnel means for conducting the classifiable mixture of solids axially and centrally through the casing to deliver it into the inner layers where the fine solids are retained from substantial departure therefrom.

20. Apparatus for classifying a mixture of solids to segregate solids settling faster than a predetermined rate of settling into a liquid-suspended coarse fraction and into a liquid-suspended fines fraction, which comprises an enclosed circular casing having one discharge outlet for the coarse fraction and an axial discharge outlet for the fines fraction, means for force-feeding liquid tangentially to the casing with a pressure sufficient to set up in the casing a vortically rotating liquid body with inner and outer layers adapted centrifugally to segregate coarse solids in the outer layers and to segregate fine solids in the inner layers, and means for conducting the classifiable mixture of solids axially and centrally through the casing in the same direction as that of the fines fraction outflow through the axial outlet to deliver it into the inner layers where the fine solids are retained from substantial departure therefrom.

References Cited in the file of this patent

UNITED STATES PATENTS

| Number | Name | Date |
|---|---|---|
| 762,868 | Allen | June 21, 1904 |
| 856,611 | Wetherbee | June 11, 1907 |
| 1,115,897 | Buchanan | Nov. 3, 1914 |
| 1,149,463 | Pardee | Aug. 10, 1915 |
| 1,197,946 | Pardee | Sept. 12, 1916 |
| 1,595,257 | Stebbins | Aug. 10, 1926 |
| 1,624,518 | Stebbins | Apr. 12, 1927 |
| 1,669,820 | Grant | May 15, 1928 |
| 1,845,358 | Stebbins | Feb. 16, 1932 |
| 1,897,144 | Prouty | Feb. 14, 1933 |
| 2,104,537 | Ellis | Jan. 4, 1938 |
| 2,312,706 | Freeman | Mar. 2, 1943 |
| 2,329,299 | Rouke | Sept. 14, 1943 |
| 2,554,480 | Morton | May 22, 1951 |
| 2,590,691 | Fontein | Mar. 25, 1952 |

FOREIGN PATENTS

| Number | Country | Date |
|---|---|---|
| 14,428 | Great Britain | of 1913 |
| 115,681 | Sweden | Jan. 22, 1946 |
| 238,137 | Switzerland | Oct. 16, 1945 |
| 506,488 | Great Britain | May 30, 1939 |